United States Patent Office 3,419,420

Patented Dec. 31, 1968

3,419,420

MAGNETIC COATING COMPOSITIONS

Frederick A. Stahly and Wesley Dale Humphriss, Rochester, N.Y., assignors to Eastman Kodak Company, Rochester, N.Y., a corporation of New Jersey No Drawing. Filed Nov. 2, 1964, Ser. No. 408,336
13 Claims. (Cl. 117—138.8)

ABSTRACT OF THE DISCLOSURE

A magnetic recording tape having a coating of magnetic oxide particles bound by a poly (vinyl butyral) resin adsorbed to the oxide particles in a ratio of 10 to 70 or more milligrams of binder per gram of oxide. The resin should contain 5 to 17% poly (vinyl alcohol). Advantageously, the ratio of magnetic oxide particles to binder is between 2 and 10 to 1. The coating is prepared by forming a dispersion comprising a thixotropic solution of the resin, a nonpolar solvent, and the magnetic oxide particles, subjecting the dispersion to shear forces to decrease its viscosity, coating the resulting thinned dispersion onto a tape base, and allowing the thixotropic dispersion to again become viscous while the solvent evaporates.

This invention relates to coating compositions and magnetic recording tapes utilizing such coating compositions. More particularly, this invention pertains to coating compositions wherein the binder is present in unusually small relative amounts and is adsorbed to the magnetic oxide, and to magnetic recording tapes using such composition to produce a very smooth surface and homogeneous fine-grained internal structure.

Magnetic recording tapes are generally made by dispersing magnetically active particles throughout a neutral binder to form a mixture and then coating the mixture upon a pliable film or web carrier. The ratio of magnetic particles to binder is usually in the range of 2:1–4:1 on a weight basis. As might be expected, certain desirable properties of the recording tape are enhanced when the relative amount of magnetic oxide particles is increased and other desirable properties are obtained when the relative amount of binder is increased.

For instance, increasing the amount of magnetic oxide in the composition normally increases the frequency response and quality of playback signal obtainable without distortion. But this basic and vital improvement is usually obtained only at the expense of decreased wear resistance of the tape.

Increased wear resistance is generally obtained by increasing the relative amount of binder and usually results in a corresponding decrease in signal strength and quality from the resulting tape.

Thus it can be seen that the magnetic oxide-binder ratio is usually determined on a compromise basis with none of the funadamental properties of the tape being optimized though the ratio can be shifted to improve certain properties vital in specific uses at the expense of less important properties for that use.

There is yet another common difficulty encountered in producing magnetic recording tape. That is the propensity of the magnetic oxide to form aggregations of particles after coating before the binder sets. It will be recognized that the magnetic particles often have a mutual attraction and, as a practical matter, some time must be allowed after coating for the binder to set so that it does not irreversibly set before or during coating of the carrier. Clumps of magnetic oxide often form before the binder sets. Lack of homogeneous dispersion of the magnetic oxides causes decidedly inferior performance of the tape since areas of the tape will contain no recording medium while other areas will contain aggregates of particles which cannot be fully and effectively utilized. Uneven dispersion of the magnetic oxide particles adversely affects noise ratio and detracts from the quality of the tape.

It is an object of the present invention to provide a coating composition having a very high magnetic oxide-to-binder ratio wherein the physical qualities of the tape are enhanced as well as the electroacoustical qualities.

A further object of the invention is to provide a magnetic tape displaying superior wear resistance.

A still further object of the invention is to provide a magnetic tape having greater strength than conventional tapes.

Another object of the invention is to provide a composition wherein the magnetic oxide particles can be rendered immobile relative to one another either in the coating solution or immediately upon coating independently of the setting of the binder so that the immobility can be reversed upon performing a simple physical process step.

These objects are accomplished by the present invention by forming a coating composition having a magnetic oxide-to-binder ratio of between 2:1–10:1 of a magnetic iron oxide and a specific binder which will adsorb from 10–70 or more milligrams of binder polymer per gram of magnetic oxide. The preferred adsorption level is from 25 to 45 milligrams of binder per gram of magnetic oxide.

To accomplish the abnormally high specified levels of adsorption, it is necessary that specific poly (vinyl butyral) compositions within a certain range be employed as the binder. Further it is imperative that specific types of solvents be avoided in preparing the composition. Of course the solvent will not remain in the composition after coating on the carrier, but the high levels of adsorption cannot be reached unless specified solvents are avoided while preparing and coating the composition.

The specific binder of the instant invention is a poly (vinyl butyral) which contains 5–17 percent poly (vinyl alcohol), and preferably 9–13 percent poly (vinyl alcohol). It has been found that this binder adsorbs to magnetic oxide particles in large quantities. Such adsorption permits the use of relatively less binder without compromising the wear properties in the magnetic tape. A somewhat similar situation appears in the compounding of rubber wherein the addition of carbon black particles causes the vulcanized rubber to be much tougher than a similar compound without the carbon black. The roughly similar use of magnetic oxide particles to enhance the strength of the binder in the present invention is obviously a most significant improvement.

Only certain type of solvents may be employed in the present invention if the adsorption of poly (vinyl butyral) to iron oxide is not to be poisoned. The adsorption level is roughly inversely related to the polarity of the solvent. Polar solvents such as alcohols including ethanol are inoperative in the invention. Methyl isobutyl ketone, acetone, ethyl acetate, toluene, 1,1,1 - trichloroethane, 1,1,2 - trichloroethane and mixtures thereof are convenient examples of the many workable relatively nonpolar solvents. All of the solvents and solvent mixtures useful in the invention promote adsorption of poly (vinyl butyral) to magnetic oxide. As stated above, the adsorption must be at least 10 milligrams of polymer per gram of iron oxide.

Adsorption is a natural condition between the specified poly (vinyl butyral) and magnetic oxide. However, if care is not exercised in choosing the proper solvent, the adsorption sites on the magnetic oxide will be occupied by polar groups of the solvent. Such poisoning of the adsorption sites renders the principle of the present invention inoperative.

Numerous solvents do operate satisfactorily in the instant invention. It would be unrealistic to attempt to list the thousands of suitable solvents and combinations thereof. Since the choice of solvent or solvent systems often depends on different circumstances, such as the choice of carrier or economic considerations, no single solvent or solvent system is clearly superior for all uses. However, preferred solvents and solvent systems are methyl isobutyl ketone, methyl isobutyl ketone with 0–20 percent acetone, methyl isobutyl ketone with 0–50 percent ethyl acetate, toluene, toluene with 0–20 percent acetone, toluene with 0–50 percent ethyl acetate, 1,1,1-trichloroethane, 1,1,1-trichloroethane with 0–50 percent 1,1,2-trichloroethane.

Workable solvents and solvent systems can be easily determined by preparing a 1.0 percent by weight solution of the specified poly (vinyl butyral) binder in the solvent system of concern. Ten grams of magnetic oxide powder are added to 50 grams of the prepared solution. The mixture is then agitated and allowed to come to equilibrium, preferably by allowing it to stand overnight, but at least for 2½ hours. After equilibrium is reached, the solution is centrifuged for 10 minutes to completely settle the iron powder. The supernatent liquid is then evaporated, and the polymer remaining in solution thus determined. It has been found that the difference between the remaining polymer and that originally in the solution is an accurate indication of the polymer adsorbed to the magnetic oxide. If at least 10 milligrams of polymer per gram of magnetic oxide is adsorbed, the solvent is nonpolar for the purposes of the invention. Preferred solvents are those which allow adsorption of at least 25 milligrams of poly (vinyl butyral) per gram of magnetic oxide. As a general rule it has been found that the so-called "strong" or "good" polymer solvents adversely affect the desired adsorption while the so-called "weak" or "poor" polymer solvents permit high adsorption.

A variety of commercial magnetic oxides as well as other proprietary magnetic materials can be utilized in the instant invention. A preferred material is gamma $Fe_2O_3$. These magnetic oxides are widely available and display desirable adsorption characteristics unless treated, such as with the above discussed "strong" solvents, to saturate or decrease the number of adsorption sites.

The magnetic oxide-poly (vinyl butyral) composition of the instant invention can be deposited on many pliable carriers. Conventional carriers such as poly (ethylene terephthalate), cellulose acetate and other conventional pliable polymer carriers are suitable for use with the herein composition.

In addition to the concurrent improvement of physical and electroacoustical properties resulting from the stronger binders, the above discussed compositions displays yet another advantage. As a result of the high adsorption level between the poly (vinyl butyral) binder and magnetic oxide, the composition, when dispersed in a suitable nonpolar solvent, forms a thixotropic solution. In such a solution, the magnetic oxide particles are held immobile even while the binder is unset. However, when subjected to shear, the thixotropic solution undergoes a large decrease in viscosity. In effect, the solution is a solid until agitated by shear whereupon it becomes liquid in nature. The solutions of the composition of the instant invention are subjected to shear immediately before coating. Thus, while coating, the solution functions as a liquid. However, when the coating is accomplished and the solution is no longer subjected to shear, the viscosity again increases thereby preventing grouping of the magnetic oxide particles in the fresh coating. The prevention of grouping or clumping is not a result of the binder setting, but primarily the result of the coating reverting to its "solid" thixotropic state. Greatly improved homogenity results from this coating technique utilizing the thixotropic nature of this solution.

Thixotropic solutions are often avoided because they are more difficult to work with. However, the substantial increase in quality more than outweighs the minor increase in complexity of the coating operation. Apparatus such as disclosed in Lawrence C. Bartlett et al., U.S. Patent 3,227,136, granted Jan. 4, 1966, for Extrusion Coating Apparatus is capable of producing high quality magnetic tape with the thixotropic composition of the instant invention.

The invention will be more easily understood upon consideration of the following examples.

EXAMPLE I

A coating composition for magnetic tapes was prepared from the following composition.

| | Percent by weight |
|---|---|
| Butvar B–76 | 6.6 |
| Magnetic iron oxide | 33.4 |
| Methyl isobutyl ketone | 51.0 |
| Acetone | 9.0 |

Oxide to binder ratio, 5/1.

Butvar B–76 is a commercial poly (vinyl butyral), having a hydroxyl content expressed as percent poly (vinyl alcohol) of between 9 and 13, produced by the Shawinigan Resins Corporation. It is a preferred binder for use in the instant invention. The above specified formula was ballmilled seven days until complete dispersion was accomplished. It was then coated onto a poly (ethylene terephthalate) carrier using thixotropic techniques and allowed to harden. The thus formed magnetic tape was found to have excellent properties.

EXAMPLE II

A magnetic tape such as that described in Example I was prepared utilizing a poly (vinyl butyral) having a poly (vinyl alcohol) content of 2 percent.

EXAMPLE III

A magnetic tape such as that described in Example I was prepared utilizing a poly (vinyl butyral) having a poly (vinyl alcohol) content of more than 17 percent. The poly (vinyl butyral) in this example was Butvar B–90 which has a hydroxyl content expressed as percent poly (vinyl alcohol) of between 18 and 20.

EXAMPLE IV

A magnetic tape as in Example I was prepared except that the acetone in the coating composition was replaced with methyl alcohol.

EXAMPLE V

The thixotropic coating composition of Example I was used to produce a magnetic tape using a non-shearing coating technique.

The electroacoustical characteristics of the magnetic tapes produced in the above example are compared in the following table.

TABLE I.—ELECTROACOUSTICAL RESULTS

| | Example I | Example II | Commercial Tapes |
|---|---|---|---|
| Bias | ±0% | 0 | 0%. |
| Low frequency sensitivity, 400 c.p.s. | +1.0 db. | 0 | 0 db. |
| High frequency sensitivity, 15 kc./s. | +2.0 db. | 0 | 0 db. |
| Frequency response | +1.0 db. | 0 | 0 db. |
| Undistorted output | +1.0 db. | 0 | 0 db. |
| Saturated output | +1.0 db. | 0 | 0 db. |
| Low frequency signal to noise ratio, Modulation 0–1 kc. | +2.0 db. | 0 | 0 db. |
| High frequency signal to noise ratio, Modulation 1–20 kc. | +2.0 db. | 0 | 0 db. |
| Zero signal-signal to noise ratio | +2.0 db. | 0 | 0 db. |

NOTE.—Examples III, IV, V—No samples to test because dispersions of Examples III and IV were too poor to coat and coating of Example V was too poor to test.

Thus it is clear that the electroacoustical properties of the magnetic tape produced according to the instant invention, i.e., Example I, are improved over those of commonly available commercial tapes. Further, it is apparent that the hydroxyl content expressed as poly (vinyl alcohol) in the poly (vinyl butyral) is a critical consideration.

The physical characteristics of the tape produced in the above sheet are described in the following table.

TABLE II.—PHYSICAL RESULTS

| | Example I | Example II | Commercial Tapes |
|---|---|---|---|
| Cohesive Strength | Excellent | Good | Good. |
| Wear Resistance | do | do | Do. |
| Moisture Resistance | do | do | Do. |
| Tensile Elongation | do | do | Do. |
| Scratch Resistance | do | do | Do. |

NOTE.—Examples III, IV, V—No samples to test because dispersions of Examples III and IV were too poor to coat and coating of Example V was too poor to test.

The rating "good" for commercial tapes is a typical acceptable value for a given property although many commercial varieties are relatively poor in one or more of these physical properties.

Thus the physical characteristics of the tape produced according to the instant invention are improved relative to both commercial tapes and tapes similar to those of the invention, but outside of the specified critical limits. Also, the importance of using thixotropic coating methods is evident.

As will be evident to those skilled in the art, the above description and examples are merely illustrative and not intended to limit the invention.

We claim:

1. A magnetic recording tape coating composition comprising a major proportion of magnetic oxide particles and a minor proportion of a binder consisting essentially of a poly (vinyl butyral) binder containing 5–17% poly (vinyl alcohol), said binder being adsorbed to said oxide particles in a ratio of at least 10 milligrams of binder per gram of magnetic oxide particles.

2. A coating composition as set forth in claim 1 wherein the magnetic oxide particles are gamma $Fe_2O_3$.

3. A coating composition as set forth in claim 2 wherein the binder is adsorbed to the $Fe_2O_3$ in the range of from 25 to 45 milligrams of binder per gram of $Fe_2O_3$.

4. A magnetic recording tape coating composition comprising a major proportion of magnetic oxide particles dispersed in a minor proportion of a thixotropic solution of a resinous binder consisting essentially of a poly (vinyl butyral) resin containing 5–17% poly (vinyl alcohol), and a nonpolar solvent.

5. A coating composition as set forth in claim 4 wherein the magnetic oxide particles-to-binder ratio is within the range of 10:1–2:1.

6. A coating composition as set forth in claim 5 wherein the nonpolar solvent comprises at least one of the class including methyl isobutyl ketone, acetone, ethyl acetate, toluene, 1,1,1-trichloroethane, or 1,1,2-trichloroethane.

7. A coating composition as set forth in claim 4 wherein the magnetic oxide particles are gamma $Fe_2O_3$.

8. A magnetic recording tape comprising a magnetic coating composition consisting essentially of a binder in minor proportion and magnetic oxide particles in major proportion disposed in an adherent coating upon a pliable carrier, said binder consisting essentially of poly (vinyl butyral) resin containing 5–17% poly (vinyl alcohol), said binder being adsorbed to said oxide particles in a ratio of at least 10 milligrams of binder per gram of magnetic oxide particles.

9. A magnetic recording tape as set forth in claim 8 wherein said poly (vinyl butyral) has a poly (vinyl alcohol) content of 9–13 percent.

10. A magnetic recording tape as set forth in claim 8 wherein said magnetic oxide particles are gamma $Fe_2O_3$.

11. A magnetic recording tape as set forth in claim 8 wherein said pliable carrier is poly (ethylene terephthalate).

12. A magnetic recording tape comprising a poly (vinyl butyral) binder having a poly (vinyl alcohol) content of 9–13 percent, gamma $Fe_2O_3$ particles dispersed throughout said binder in a particle-to-binder ratio of 10:1–2:1, and a pliable poly (ethylene terephthalate) carrier, said binder and particles being disposed as an adherent coating on said carrier.

13. A method of preparing magnetic recording tape comprising forming a thixotropic dispersion consisting essentially of a major proportion of magnetic oxide particles, a minor proportion of binder consisting essentially of poly (vinyl butyral) resin containing 5–17% poly (vinyl alcohol), and a nonpolar solvent, subjecting the thus formed dispersion to shear forces to decrease the viscosity of such dispersion, coating the dispersion onto a pliable carrier while the viscosity is decreased, and allowing the thixotropic dispersion so coated to again become viscous while the solvent evaporates.

References Cited

UNITED STATES PATENTS

| | | | |
|---|---|---|---|
| 2,666,719 | 1/1954 | Lissant | 117—132 |
| 2,914,480 | 11/1959 | Hagopian | 252—62.54 |
| 3,080,319 | 3/1963 | Arrington | 274—41.4 |
| 3,135,625 | 6/1964 | Ingrassia | 117—62.2 |
| 3,240,621 | 3/1966 | Flower et al. | 117—93.2 |
| 3,243,376 | 3/1966 | Lovick et al. | 252—62.53 |
| 3,216,846 | 11/1965 | Hendricx et al. | 117—62 |

WILLIAM D. MARTIN, *Primary Examiner.*

B. PIANALTO, *Assistant Examiner.*

U.S. Cl. X.R.

117—121, 145, 161; 252—62.54